(12) United States Patent
Nagai et al.

(10) Patent No.: US 12,529,676 B2
(45) Date of Patent: Jan. 20, 2026

(54) SENSOR MODULE SYSTEM

(71) Applicant: KABUSHIKI KAISHA TOSHIBA, Tokyo (JP)

(72) Inventors: Miyu Nagai, Yokohama Kanagawa (JP); Yoshiaki Sugizaki, Fujisawa Kanagawa (JP); Hideyuki Tomizawa, Ota Gumma (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 239 days.

(21) Appl. No.: 18/458,335

(22) Filed: Aug. 30, 2023

(65) Prior Publication Data
US 2024/0201124 A1 Jun. 20, 2024

(30) Foreign Application Priority Data

Dec. 16, 2022 (JP) ................................. 2022-201142

(51) Int. Cl.
*G01N 27/414* (2006.01)
(52) U.S. Cl.
CPC .............................. *G01N 27/4145* (2013.01)

(58) Field of Classification Search
None
See application file for complete search history.

(56) References Cited

U.S. PATENT DOCUMENTS

2019/0369044 A1\* 12/2019 Chang ................ H10D 84/0167
2022/0082520 A1   3/2022 Sugizaki

FOREIGN PATENT DOCUMENTS

JP      2022-49756 A    3/2022

\* cited by examiner

*Primary Examiner* — J. Christopher Ball
(74) *Attorney, Agent, or Firm* — Finnegan, Henderson, Farabow, Garrett & Dunner, LLP

(57) ABSTRACT

According to one embodiment, a sensor module system includes a first sensor module including a probe molecule that responds to light irradiation with charge, and a second sensor module including no probe molecule. A first flow path is connected to one end side of the first sensor module, and a second flow path is connected to the other end side. A third flow path branching from the first flow path is connected to one end side of the second sensor module, and a fourth flow path joining the first flow path is connected to the other end side. A valve capable of opening and closing the third flow path is connected to a junction of the first flow path and the third flow path.

14 Claims, 13 Drawing Sheets

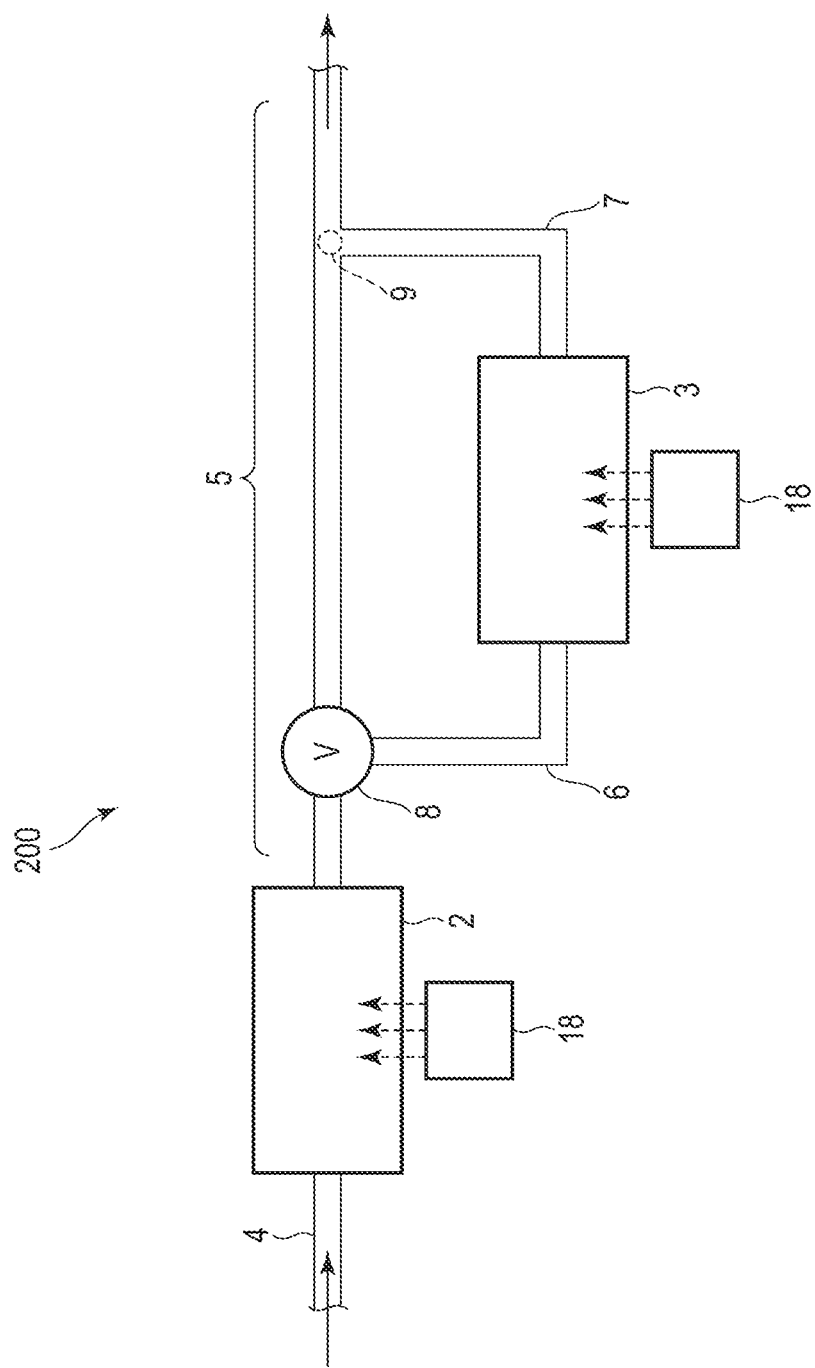
F I G. 3

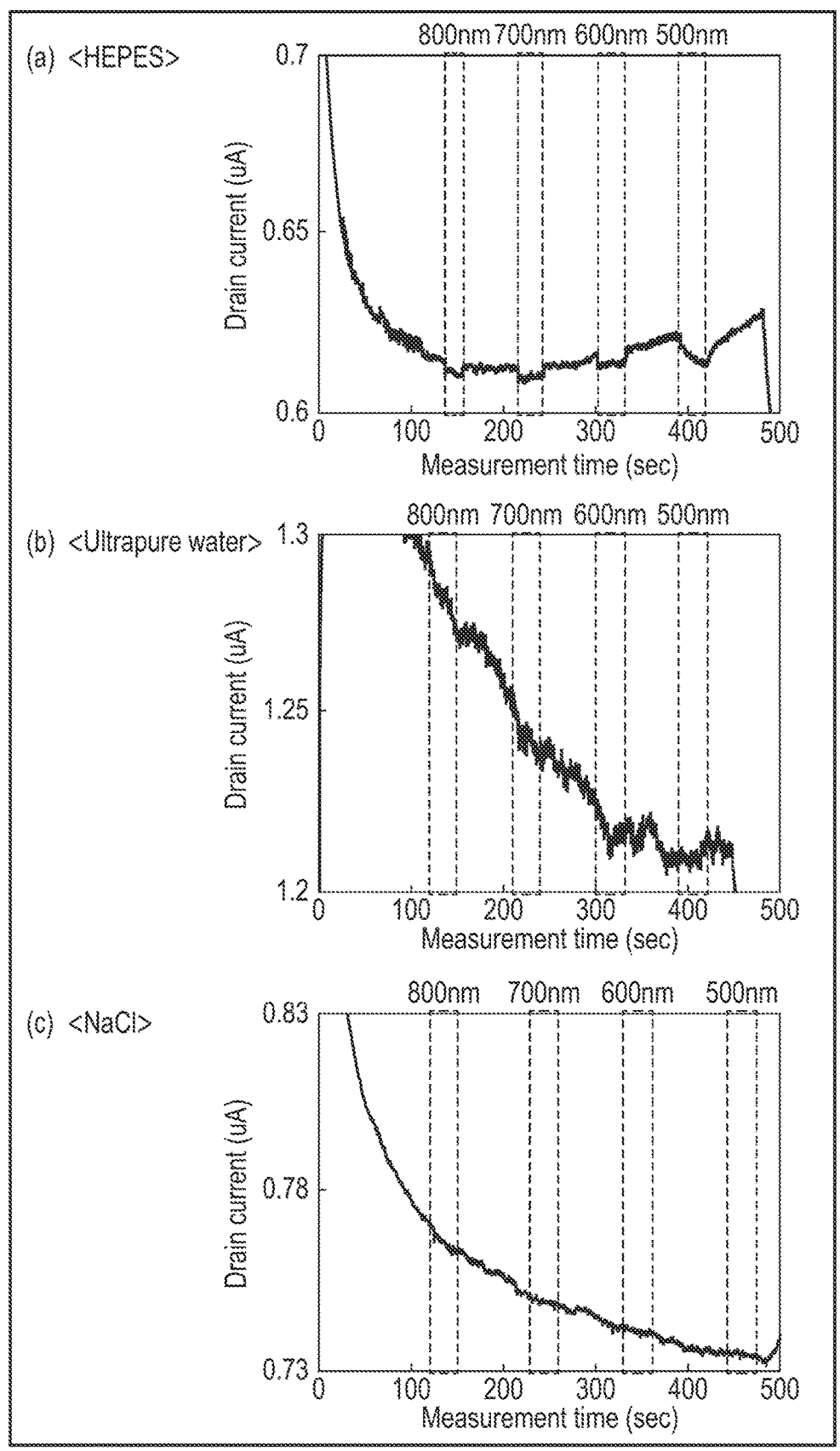
F I G. 8

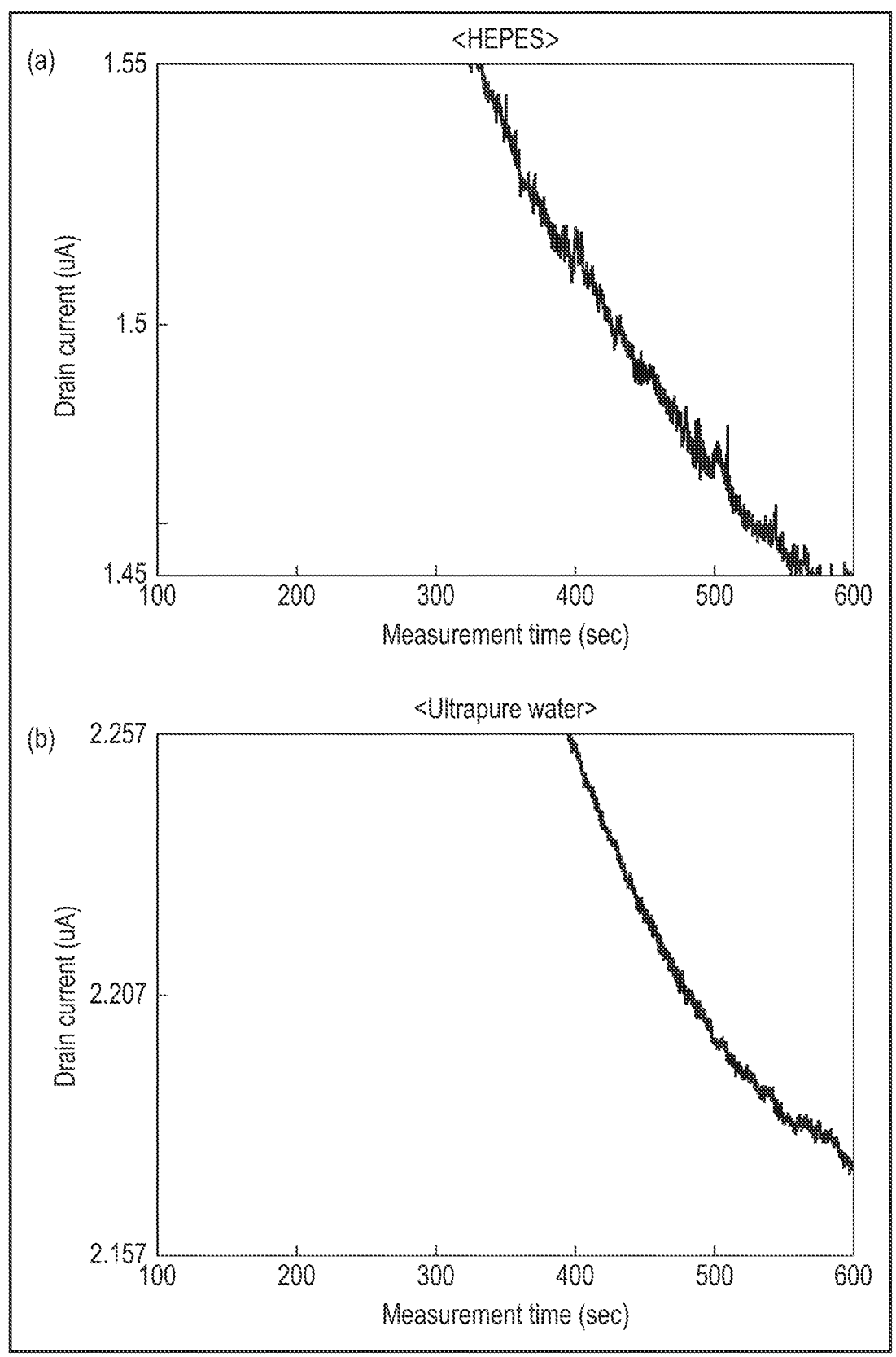
F I G. 9

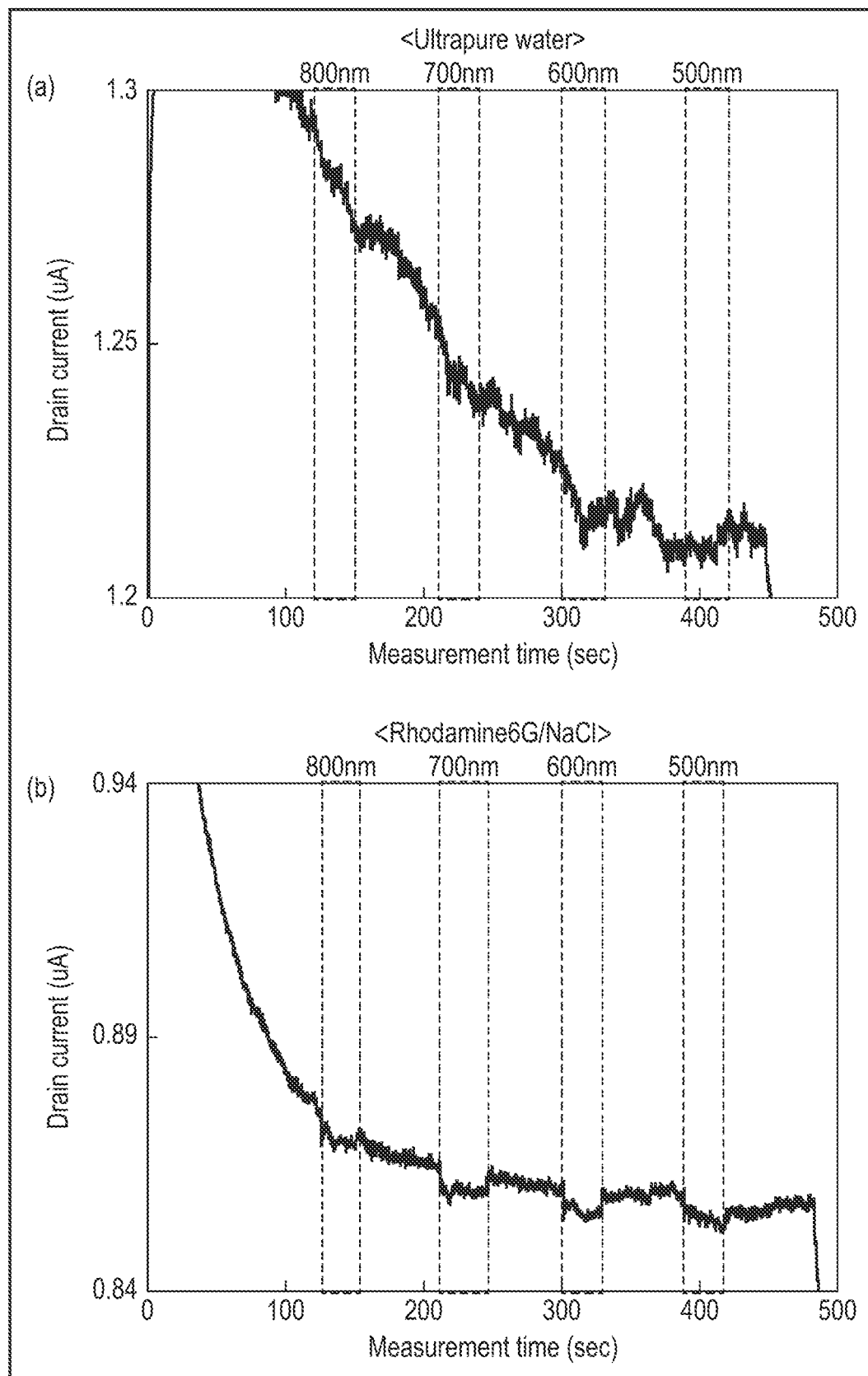
F I G. 10

SENSOR MODULE SYSTEM

CROSS-REFERENCE TO RELATED APPLICATIONS

This application is based upon and claims the benefit of priority from Japanese Patent Application No. 2022-201142, filed Dec. 16, 2022, the entire contents of which are incorporated herein by reference.

FIELD

Embodiments described herein relate generally to a sensor module system.

BACKGROUND

There is a need for a system that inspects the presence or absence of probe molecules on a sensor chip before measurement of the sensor chip.

BRIEF DESCRIPTION OF THE DRAWINGS

FIG. 3 is a schematic diagram illustrating a configuration of a sensor module system according to a second embodiment.

FIG. 8 is a graph illustrating a result of a buffer ion residue inspection using a second sensor module among experimental results of Example 1, wherein part (a) of FIG. 8 shows a measurement result of the second sensor module including a liquid membrane made of a HEPES solution, part (b) of FIG. 8 shows a measurement result of the second sensor module including a liquid membrane made of pure water, and part (c) of FIG. 8 shows a measurement result of the second sensor module including a liquid membrane made of an aqueous sodium chloride solution.

FIG. 9 is a graph showing a result of a negative control experiment of a buffer ion residue inspection using the second sensor module among the experimental results of Example 1, wherein part (a) of FIG. 9 shows the results of a negative control experiment of the second sensor module including a liquid membrane including a HEPES solution, and part (b) of FIG. 9 shows the results of a negative control experiment of the second sensor module including a liquid membrane including pure water.

FIG. 10 is a graph showing an experimental result of Example 2, wherein part (a) of FIG. 10 shows a result of a negative control experiment using a second sensor module including a liquid membrane made of pure water, and part (b) of FIG. 10 shows a measurement result of probe molecule inspection using a second sensor module including a probe molecule to which a fluorescent dye is bound.

DETAILED DESCRIPTION

In general, according to one embodiment, a sensor module system includes a first sensor module including a probe molecule that responds to light irradiation with charge, and a second sensor module including no probe molecule. A first flow path is connected to one end side of the first sensor module, and a second flow path is connected to the other end side. A third flow path branching from the first flow path is connected to one end side of the second sensor module, and a fourth flow path joining the first flow path is connected to the other end side. A valve capable of opening and closing the third flow path is connected to a junction of the first flow path and the third flow path.

Hereinafter, various embodiments of the present invention will be described with reference to the drawings. Each drawing is a schematic view for promoting the embodiment and the understanding thereof, and the shape, size, ratio, and the like are different from the actual ones, but these can be appropriately changed in design in consideration of the following description and known techniques.

First Embodiment

Figure 1A:
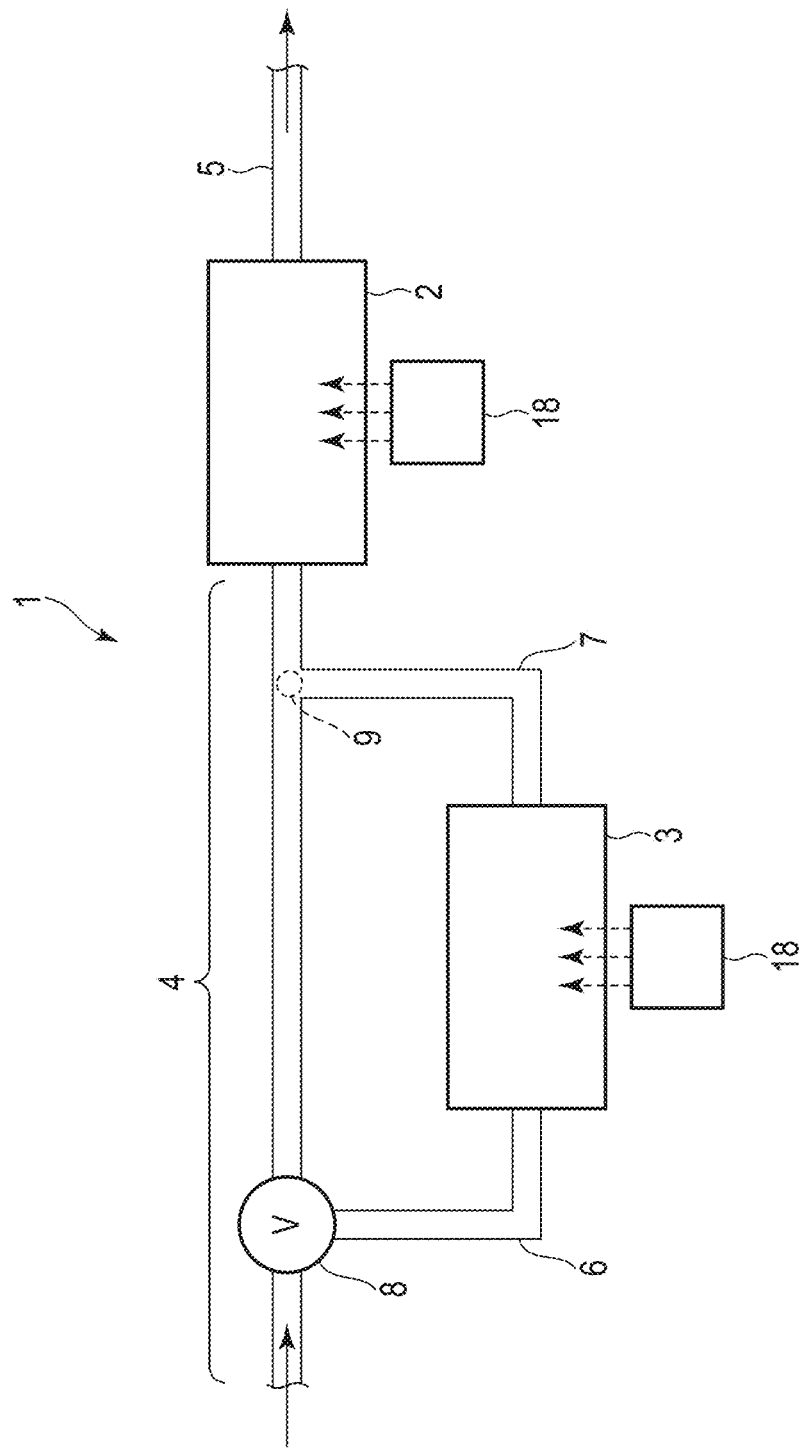
FIG. 1A is a schematic diagram illustrating a configuration of a sensor module system according to a first embodiment.

Hereinafter, a sensor module system according to a first embodiment will be described with reference to FIG. 1, which is a schematic diagram illustrating the sensor module system.

A sensor module system 1 according to the first embodiment includes a first sensor module 2 including a probe molecule that responds to light irradiation with charge, and a second sensor module 3 not including a probe molecule. A first flow path 4 is connected to one end side of the first sensor module 2, and a second flow path 5 is connected to the other end side. A third flow path 6 branching from the first flow path 4 is connected to one end side of the second sensor module 3, and a fourth flow path 7 joining the first flow path 4 is connected to the other end side. A valve 8 is provided at a junction of the first flow path 4 and the third flow path 6, and the third flow path 6 can be opened and closed. A valve 8 that enables to open and close the fourth flow path 7 may be connected to a junction 9 of the first flow path 4 and the fourth flow path 7. One end of the first flow path 4 is connected to the first module 2, and the other end is a liquid inflow port for allowing liquid to flow into the first flow path 4.

The first sensor module 2 includes a substrate 10, a sensitive film 11 disposed on the substrate 10, and a liquid film 12 disposed so as to cover the sensitive film 11, and probe molecules 13 are solid-phased on the surface of the sensitive film 11. For example, when the first sensor module 2 is a type of FET sensor, the sensitive film 11 is disposed so that a gate electrode 14 is in contact with the sensitive film 11 via the liquid film 12, and a source electrode 15 is electrically connected to one end and a drain electrode 16 is electrically connected to the other end (see part (a) of FIG. 2). A circuit that applies a voltage (that is, a gate voltage) is connected to the gate electrode 14. A circuit for applying a voltage is also formed between the source electrode 15 and the drain electrode 16, and an ammeter (not illustrated) for measuring a drain current flowing on the circuit is disposed. The source electrode 15 and the drain electrode 16 are covered with an insulating protective film 17.

Unlike the first sensor module 2, in the second sensor module 3, the probe molecules 13 are not solid-phased on the sensitive film surface 11a. However, other configurations are similar to those of the first sensor module 2. Specifically, the second sensor module 3 includes a substrate 10, a sensitive film 11 disposed on the substrate 10, and a liquid film 12 disposed so as to cover the sensitive film 11 (see part (b) of FIG. 2). For example, when the first sensor module 2 is a type of FET sensor, the second sensor module 3 has the same configuration. That is, the sensitive film 11 of the second sensor module 3 is disposed so that the gate electrode 14 is in contact with the sensitive film 11 via the liquid film 12, and the source electrode 15 is electrically connected to one end of the sensitive film 11 and the drain electrode 16 is electrically connected to the other end of the sensitive film 11. A circuit for applying a voltage (that is, a gate voltage) is connected to the gate electrode 14, a circuit for applying a voltage is also formed between the source electrode 15 and the drain electrode 16, and an ammeter (not illustrated) for measuring a drain current flowing on the circuit is disposed. The source electrode 15 and the drain electrode 16 are covered with an insulating protective film 17.

The first sensor module 2 and the second sensor module 3 are configured capable of being detached and exchanged from the sensor module system 1. In other words, the first sensor module 2 and the second sensor module 3 are members used as disposable chips or cassettes.

The liquid film 12 is disposed so that the liquid film surface 12a is in contact with the specimen sample containing the target substance, and is disposed so as to cover the sensitive film 11 and to immerse the probe molecules 13 solid-phased on the sensitive film surface 11a. The liquid constituting the liquid film 12 can be a liquid having a composition corresponding to a use state and a use purpose of the sensor module system 1. For example, when the sensor module system 1 is used for measurement of a target substance, the liquid film 12 may be constituted from a liquid capable of dissolving the target substance. For example, in a case where the sensor module system 1 is stored, the liquid film 12 may be constituted from a liquid containing arbitrary reagents necessary for storage (for example, a stabilizer, a pH adjusting agent, and the like).

The probe molecule 13 is a nucleic acid, a peptide, or a protein having a function as an aptamer, and may be naturally derived or artificially derived. Specifically, the probe molecule 13 may be, for example, a nucleic acid probe constituted from a single-stranded or double-stranded nucleic acid, or may be, for example, a probe constituted from a peptide or protein which is an enzyme. However, the probe molecule 13 of the present embodiment has a property of generating electric charge in response to light irradiation (for example, monochromatic light or the like) as described later, and it is preferable that the electrical change is larger. For example, the probe molecule 13 is labeled with a fluorescent dye, or includes a site serving as a buffer ion or a site having a fluorescence characteristic in the skeleton itself.

In addition, the sensor module system 1 includes a light source 18 used for buffer ion residue inspection and probe molecule inspection described later. The light source 18 is configured to irradiate the sensitive film surface 11a included in the first sensor module 2 and the second sensor module 3 with monochromatic light. The monochromatic light refers to light having a single wavelength, and the wavelength in the embodiment is approximately 500 nm to 800 nm. The light source 18 may be common between the first sensor module 2 and the second sensor module 3, or may be separate between the first sensor module 2 and the second sensor module 3. That is, the sensor module system 1 may include a plurality of light sources. In addition, the light source 18 may be integrated into the first sensor module 2 and the second sensor module 3, or may be configured as another module. In other words, the light source 18 may be configured as part of a replaceable chip.

The valve 8 is configured to be capable of switching an open/close state of a branch flow path (that is, the third flow path 6) connected to the downstream side of the first flow path 4, and includes, for example, a switching member. The switching member is configured to open or close the third flow path 6 by, for example, a turning operation. In addition, by connecting a valve controller or the like to the valve 8 including such a switching member, it is possible to switch the open/close state of the third flow path 6 by electrical control.

Figure 1B:
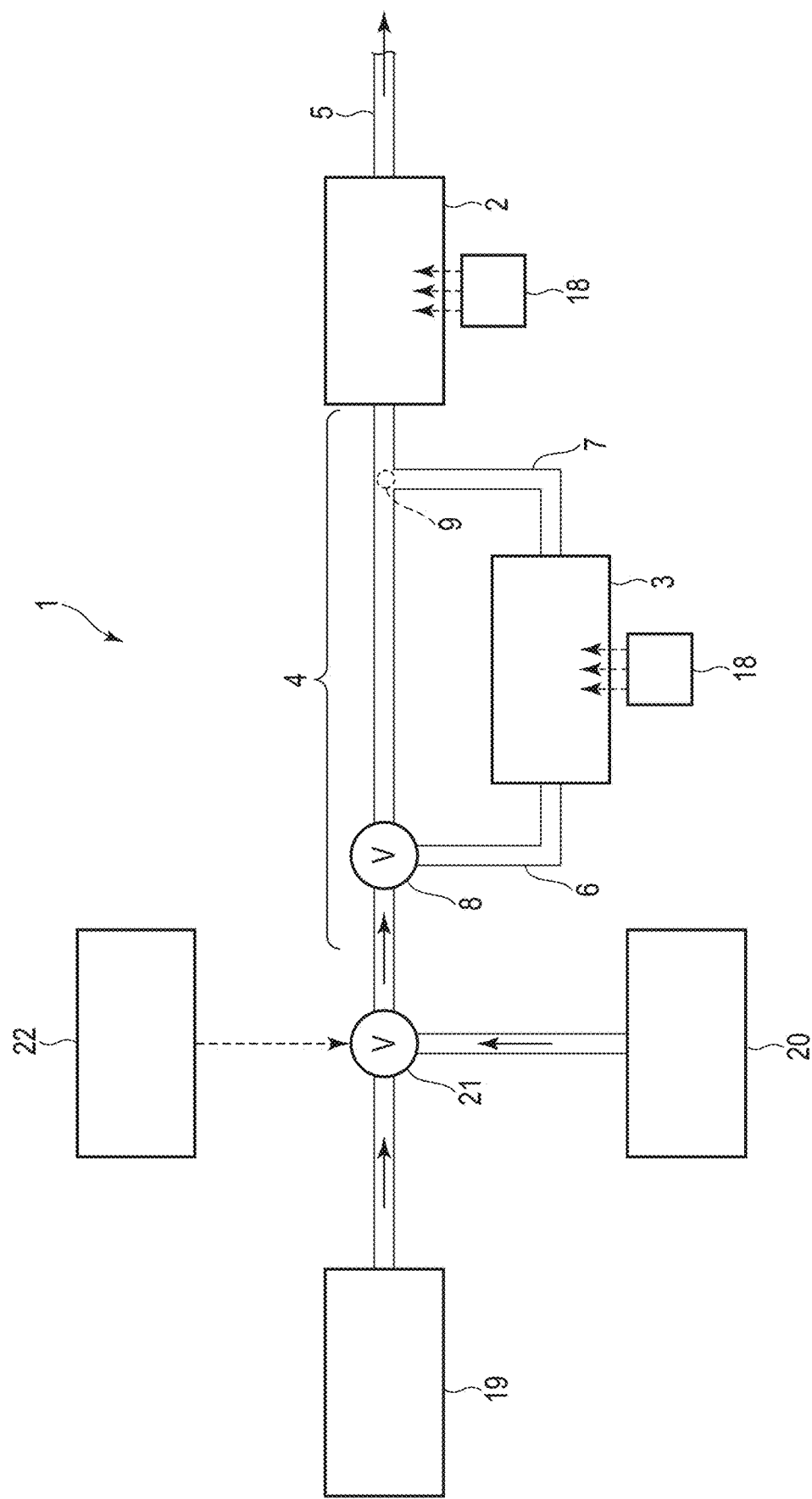
FIG. 1B is a schematic diagram illustrating a further configuration of the sensor module system of the first embodiment.

As shown in FIG. 1B, a cleaning liquid container 19 and a sample liquid container 20 may be provided upstream of the first flow path 4. A branch flow path may be connected between the upstream side end of the first flow path 4, the cleaning liquid container 19, and the sample liquid container 20, and a flow path switching valve 21 may be provided in the branch flow path. A valve controller of the flow path switching valve 21 is connected to the control circuit 22.

The cleaning liquid container 19 is a container that stores a liquid not containing buffer ions (for example, pure water), and may include a pump for transporting the cleaning liquid. The cleaning liquid flows from the cleaning liquid container 19 to the branch flow path on the more downstream side and the first flow path 4.

The sample liquid container 20 is a container that stores, as a sample liquid, a liquid to be inspected for which the sensor module system 1 performs sensing or a solution containing the liquid to be inspected, and may include a pump for transporting the sample liquid. The sample liquid may contain a target substance or a buffer ion. Since the buffer ions are contained in the sample liquid, the characteristics as a solution are stabilized, so that a noise component in sensing by the sensor module can be reduced. The sample liquid flows from the sample liquid container 20 to the branch flow path on the downstream side thereof and the first flow path 4.

Various operations (for example, analysis of a target substance, switching of a valve, transportation of a liquid, and the like) of the sensor module system 1 can be implemented by inputting a control signal to the valve controller. The control signal is output from a computer provided outside the sensor module system 1 or a control circuit 22 included in the sensor module system 1. The control circuit 22 includes, for example, a CPU, a memory, a nonvolatile storage in which various reference values and programs are stored, and the like. The control circuit 22 or a computer provided outside is connected to an output terminal of the sensor module (for example, various electrode terminals such as the source electrode 15 and the drain electrode 16).

The control circuit 22 or a computer provided outside can analyze sensing data obtained by measurement using the sensor module, determine whether or not a target substance is contained in the sample liquid, and determine whether or not buffer ions are contained in the sensor module. Furthermore, these determination results can be output in an arbitrary output format.

For example, the control circuit 22 (or a computer provided outside) can perform the control described in the following (1) to (5):

(1) The control circuit 22 controls the valve controller so as to adjust the flow path switching valve 21 to make the flow path connecting the first flow path 4 and the cleaning liquid container 19 conductive (as a result, a cleaning liquid, that is, a liquid containing no buffer ion component is introduced into the first sensor module 2 and the second sensor module 3).

(2) The control circuit 22 controls the light source so as to cause the sensitive films of the first sensor module 2 or the sensitive films of the first sensor module 2 and the second sensor module 3 to blink and emit light at desired time intervals.

(3) The control circuit 22 analyzes the sensing data obtained using the second sensor module 3, and determines whether or not the buffer ion component is contained in the first sensor module 2 and the second sensor module 3. For example, the control circuit 22 compares a value (for example, a current value or a voltage value) of the output signal obtained by the sensing using the second sensor module 3 at the time of light irradiation with a value of the output signal obtained by the sensing at the time of light non-irradiation, and determines that the buffer ion component remains in the second sensor module 3 when there is a difference therebetween. Here, the determination as to whether or not there is a difference may be performed by comparing an actual measurement value of the variation amount (or variation amount per unit time) with a preset reference value. When it is determined that the buffer ion component is contained in the first sensor module 2, the control circuit 22 controls the valve controller to continue to introduce the cleaning liquid into the first sensor module 2 and the second sensor module 3. This control is held until it is determined that the buffer ion component is not contained in the first sensor module 2. When it is determined that the buffer ion component is not contained in the first sensor module 2, the control circuit 22 executes the control of the following (4). Immediately before executing the control of (4), the control circuit 22 may control the valve controller to adjust the flow path switching valve 21 to close the flow path between the first flow path 4 and the cleaning liquid container 22 in the branch flow path.

(4) The control circuit 22 analyzes the sensing data of the first sensor module 2 and the second sensor module 3, and determines whether the probe molecular state of the first sensor module 2 is normal (probe molecule inspection). The determination is determined, for example, based on whether or not a reference amount of probe molecules is contained. Specifically, the determination may be performed by calculating a difference between the current value or the voltage value of the signal obtained by the sensing of the first sensor module 2 at the time of light irradiation and the current value or the voltage value of the signal obtained by the sensing of the second sensor module 3 under the same condition, and comparing the difference with the reference value. Alternatively, when the current value or the voltage value of the signal obtained by the sensing of the first sensor module 2 has varied between the time of light irradiation and the time of light non-irradiation, it may be determined that the probe molecule state of the first sensor module 2 is normal. In this case, the determination is performed by comparing the variation amount (or the variation amount per unit time) with the reference value.

(5) When it is determined in the control of (4) that the probe molecule state is normal, the control circuit 22 controls the valve controller to adjust the flow path switching valve 21 to connect the sample liquid container 20 and the first sensor module 2. Thus, the sample liquid is introduced into the first sensor module.

Figure 1C:
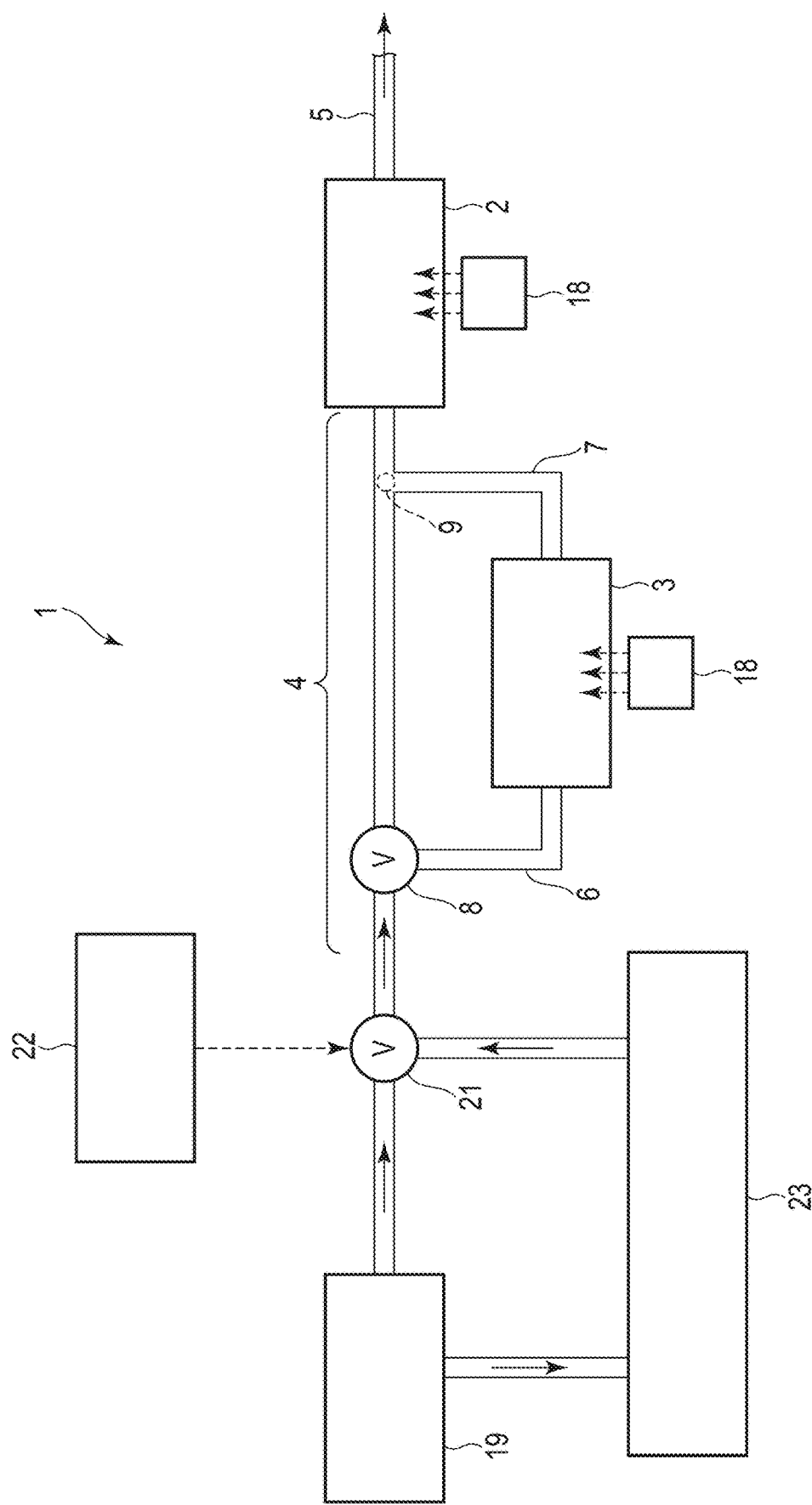
FIG. 1C is a schematic diagram illustrating another further configuration of the sensor module system of the first embodiment.

As shown in FIG. 1C, a sample taking-in unit 23 may be provided as a configuration instead of the sample liquid container 20 shown in FIG. 1B. The sample taking-in unit 23 is connected to the upstream end of the branch flow path to which the cleaning liquid container 19 and the valve 21 are connected. The sample taking-in unit 23 brings a liquid (for example, pure water) not containing buffer ions introduced from the cleaning liquid container 19 into contact with a specimen (for example, an atmosphere possibly containing a target substance), and takes a part of the specimen into the liquid not containing buffer ions. Therefore, in the sample taking-in unit 23, a sample liquid not containing buffer ions is prepared. Note that the sample taking-in unit 23 can also be regarded as the sample liquid container 20 as long as it stores the sample liquid.

Since the sensor module system 1 includes the first sensor module 2 including the probe molecules 13, it is possible to analyze the presence or absence of the target substance in the sample by supplying the sample liquid containing the target substance to the sensor module system 1. In this case, by closing the third flow path 6 with the valve 8, the supply of liquid to both flow paths and the second sensor module system 3 is stopped. Therefore, the sample liquid that has been delivered to the first flow path 4 and may contain the target substance is introduced only into the first sensor module 2. Thereafter, the liquid subjected to the analysis in the first sensor module 2 is discharged to the outside through the second flow path 5.

The sensor module system 1 subjected to the analysis of the target substance in the sample liquid by supplying the liquid as described above can be subjected to the analysis of another sample by replacing the first sensor module 2 and the second sensor module 3 with unused ones, and cleaning the inside. In other words, the sensor module system 1 is configured so that it can be used again by chip replacement and cleaning and can perform measurement repeatedly. The cleaning of the sensor module system 1 is performed by delivering the cleaning liquid from the cleaning liquid container 19 to the first flow path 4, replacing the liquid stored in the sensor module system 1 with the cleaning liquid, and filling a space not containing the liquid with the cleaning liquid when there is the space. As will be described later, the sensor module system 1 after cleaning is subjected to a buffer ion residue inspection and then subjected to a probe molecule inspection. Therefore, a liquid not containing a buffer ion component (for example, pure water) is used as the cleaning liquid.

As will be described later, the buffer ion residue inspection is a measurement performed to determine whether or not a buffer ion component is contained in a liquid flowing or stored in the sensor module system 1, and is performed using the second sensor module 3. Therefore, the second sensor module 3 is supplied with the same liquid as the liquid flowing through another flow path system (for example, the first sensor module 2, the first flow path 4, the second flow path 5, the third flow path 6, the fourth flow path 7, and the like) constituting the sensor module system 1. For this purpose, at the time of cleaning the sensor module system 1, the valve 8 is controlled to open the third flow path 6 and the fourth flow path 7 to the first flow path 4, and the cleaning liquid is also supplied to the second sensor module 3.

Therefore, describing the flow of the cleaning liquid at the time of cleaning of the sensor module system 1, the cleaning liquid delivered from the liquid delivery port is branched into a flow passing through the first flow path 4 as it is and a flow to the third flow path 6 in the valve 8. The cleaning liquid branched into the third flow path 6 passes through the second sensor module 3 and the fourth flow path 7, and joins the first flow path 4 again. The cleaning liquid flowing through the first flow path 4 after joining passes through the first sensor module 2, and is discharged through the second flow path 5.

Hereinafter, the buffer ion residue inspection performed using the sensor module system 1 will be described in detail.

The buffer ion residue inspection is performed by applying a constant voltage to the sensor element of the second sensor module 3 not including the probe molecule, irradiating the sensor element with monochromatic light, and measuring whether the current flowing through the sensor element changes before and after the irradiation with the monochromatic light. As the determination, it is determined that the buffer ion component is present in the liquid film when the current value of the sensor element changes when the irradiation with the monochromatic light is started, the changed current value is maintained during the irradiation with the monochromatic light, and a state in which the change in the current value disappears after the irradiation with the monochromatic light is ended is observed. Conversely, when no change is observed in the current value of the sensor element from the start to the end of irradiation with the monochromatic light, it is determined that the buffer ion component is not present in the liquid film. In other words, in the buffer ion residue inspection, the monochromatic light is controlled to blink at a predetermined time interval, and it is confirmed that the time interval of the blinking coincides with the time interval of the change in the current value.

Next, the principle of changing the value of the current flowing through the sensor element by irradiation with the monochromatic light in the presence of the buffer ion component will be described.

First, in a case of irradiation with monochromatic light, it is considered that electric charge in the vicinity of the surface of the sensor element is changed. Here, since the buffer ion is an ion in which a charge state of a plurality of valences can be present stably, when charge transfer occurs between the buffer ion and the graphene by light irradiation, a state in which the valence is changed by the exchanged electric charge is maintained for a certain period of time. That is, the buffer ion component can retain the charge transferred into the liquid film.

When the electric charge in the vicinity of the surface of the sensor element changes, a opposite change in electric charge is electrostatically induced to the sensor element. Due to this influence, the filling amount of electrons of the sensor element, that is, the Fermi level changes. The Fermi level indicates to which electron orbital (that is, up to which energy level) electrons are filled when electrons are filled from an electron orbital having a low energy level. In a case where the sensor element includes graphene, since the sensor element has a characteristic that the carrier density changes when the Fermi level changes, the current value also changes accordingly (in other words, in order to change the Fermi level of the graphene, for example, the electric charge may be changed in the vicinity of the graphene surface).

Since the buffer ions are liberated in the liquid, the buffer ions are not fixed in the vicinity of the graphene surface, but if the above phenomenon continuously occurs, the change in the current value is maintained. This is the possible reason why the change in the current value is maintained during the irradiation with the monochromatic light. Thereafter, when the light irradiation is turned off, the buffer ions having changed valences are diffused into the liquid, so that the Fermi level, that is, the current value returns to the original value.

Note that it is considered that the reverse charge exchanged by the graphene disappears in a moment because the graphene is connected to the source electrode and the drain electrode. That is, it is estimated that the current change caused by the exchange of electronic charges by the graphene is small to such an extent that it is not observed. Therefore, it is most reasonable to interpret that the Fermi level of the graphene is modulated when a current change occurs in the graphene and the change is maintained.

On the other hand, on the surface of the sensor element of the first sensor module 2, a probe molecule labeled with fluorescent dye, or a probe molecule including a site serving as a buffer ion or a site having a fluorescence characteristic is fixed. For example, when the surface of the sensor element of the first sensor module 2 including probe molecules labeled with a fluorescent dye is irradiated with monochromatic light, electrons move from the highest occupied molecular orbital (HOMO) of the fluorescent dye to graphene, or electrons move from graphene to the lowest unoccupied molecular orbital (LUMO) of the fluorescent dye. That is, the fluorescent dye is charged by light irradiation.

Since the fluorescent dye in such a charged state does not include a pair of an electron and a hole, the electron and the hole are not recombined. Therefore, the fluorescent dye and thus the probe molecule can retain an electric charge for a certain period of time. As a result, in the graphene to which the probe molecules are bound, the Fermi level is modulated as described above, and the current value changes. Note that electrons and holes do not recombine but are present in the liquid, and therefore may be discharged into the liquid after a certain period of time. This is the possible reason why the current value returns to the original current value when the light irradiation is turned off.

The mechanism by which the light response is generated by the estimated buffer ion component has been described above. As will be described later, experimental results supporting such a mechanism have been obtained, and the estimation is sufficiently probable.

As a final form of the product, the sensor module system 1 of the present embodiment can be provided in a state in which probe molecules are solid-phased on a sensor element, and in a state in which a water-soluble protective film for protecting the probe molecules is coated on the sensor element. However, depending on the storage state, the sensor module system 1 may be unintentionally brought into an undesirable state with respect to the probe molecule. Examples of the undesirable state include a state in which the solid-phased probe molecules are peeled off from the surface of the sensor element, a state in which the probe molecules are deteriorated (altered), and a state in which the protection film is not completely removed and the probe molecules are partially covered. Therefore, in order to ensure reliability such as sensitivity and accuracy of the sensor, it is desirable to perform an inspection to confirm the state of the probe molecule on the sensitive film 11 before analysis of the target substance using the sensor.

As an inspection for confirming the state of a probe molecule, conventionally, a method of detecting a change in a current value generated when a probe molecule is solid-phased on a sensor element, or a method of performing a probe molecule detection experiment using a sample containing a target substance (that is, positive control) has been proposed. However, such methods do not allow for inspections to be conducted at any time. In the inspection using the positive control, the probe molecule capturing the target substance contained in the positive control loses the capturing performance. That is, there are problems in that the sensitivity to the target substance in the sample is lowered and erroneous detection may occur when the sensor is subjected to the analysis for the sample after the inspection using the positive control. In addition, even if the operation of cleaning the sensor subjected to the positive control is performed with the intention of eliminating such a decrease in sensitivity, the probe molecules may be peeled off by the cleaning operation.

Therefore, the inventors have found, as a method for solving the problems of the conventional probe molecule inspection method, a method for detecting by the light response of probe molecules as described above. The method for detecting a probe molecule by light response is non-contact and non-destructive, so that the performance of the probe molecule can be maintained, and the method can be used conveniently and whenever necessary. Therefore, the method is a very effective method for quality assurance and stabilization of detection of a target substance in a sample.

However, the present inventor has recently revealed that the detection method by light response also detects a buffer ion component contained in the measurement environment (described later in Examples). That is, it was suggested that it was difficult to distinguish between the signals of both in a measurement environment in which both are present.

Therefore, the inventors have found that the sensor module system 1 according to the embodiment is used in the detection of probe molecules. Since the sensor module system 1 according to the embodiment includes the first sensor module 2 and the second sensor module 3 configured as described above, the buffer ion residue inspection and the probe molecule inspection can be performed in the same flow path, and the influence of the buffer ion residue as noise can be eliminated.

Specifically, by cleaning the sensor module system 1 until disappearance of the buffer ion residue is confirmed in the light response detection using the second sensor module 3, it is possible to eliminate the influence of the buffer ion residue in the light response detection in the first sensor module 2. As a result, in the first sensor module 2 of the sensor module system 1 according to the embodiment, it is possible to accurately confirm the state of the probe molecule, particularly whether or not the probe molecule is bound to the sensitive film.

As a further embodiment, the sensor module system 1 may have a feedback cleaning function of automatically performing cleaning based on the result obtained by the buffer ion residue inspection. Specifically, the sensor module system 1 may include a measurement unit that monitors the current value of the sensitive film 11, a storage unit that stores the current value obtained by the measurement unit, a comparison unit that compares the value detected by the measurement unit with the value stored in the storage unit, and a control unit that controls whether to supply a cleaning liquid (for example, pure water) to the liquid delivery port of the sensor module system 1 based on the result obtained by the comparison unit (none of them are illustrated). With such a configuration, the sensor module system 1 is automatically cleaned, and contamination by the buffer ion residue can be effectively prevented.

In addition, as a further embodiment, in a case where only a sample for which it is certain that no buffer ion component is present is supplied to the sensor module system 1, the buffer ion residue inspection is not necessary, and thus the sensor module system 1 does not need to include the second sensor module 3. In such a case, the sensor module 1 may include the first sensor module 2, the first flow path 4, the second flow path 5, and the light source for probe molecule inspection and sample analysis.

Second Embodiment

FIG. 3 is a schematic diagram illustrating a sensor module system according to a second embodiment. In FIG. 3, members similar to those in FIG. 1 described in the first embodiment are denoted by the same reference numerals, and description thereof is omitted.

A sensor module system 200 of the second embodiment is different in that the second sensor module 3 is provided downstream of the first sensor module 2. More specifically, in the second sensor module 3 of the sensor module system 200, the valve 8 is provided in the second flow path 5. Similarly to the first embodiment, a third flow path 6 branches from the second flow path 5 in the valve 8, and the third flow path 6 is connected to an upstream end of the first sensor module 3. The downstream end of the first sensor module 3 is connected to a fourth flow path 7, and the fourth flow path 7 joins the second flow path 5 at the junction 9.

When the target substance in the sample is analyzed using the sensor module system 200, the supply of the liquid to the second sensor module system 3 and the fourth flow path 7 is stopped by closing the third flow path 6 with the valve 8. Therefore, the liquid containing the sample delivered to the first flow path 4 is introduced only into the first sensor module 2. Thereafter, the liquid subjected to the analysis in the first sensor module 2 is discharged to the outside through the second flow path 5. Therefore, when the target substance in the sample is analyzed, the liquid containing the sample flows through the same flow path as the sensor module system 1 of the first embodiment.

However, the flow of the cleaning liquid at the time of cleaning the sensor module system 200 is different from that of the sensor module system 1 of the first embodiment. The cleaning liquid delivered from the liquid delivery port passes through the first flow path 4 and the first sensor module 2, and flows to the second flow path 5. In the valve 8, a flow directly passing through the second flow path 5 and a flow to the third flow path 6 are branched. The cleaning liquid branched into the third flow path 6 passes through the second sensor module 3 and the fourth flow path 7, and joins the second flow path 5 again at the junction 9. The cleaning liquid passes through the second flow path 5 and is discharged from the downstream end thereof.

Since the second sensor module 3 of the sensor module system 200 of the second embodiment is provided downstream of the first sensor module 2, it is possible to detect the buffer ion residue in the liquid that has already passed through the first sensor module 2. Therefore, the second sensor module 3 can perform an inspection that reflects the influence of the buffer ion residue in the sensor module system 200 (including the first sensor module 2) on the upstream side of the second sensor module 3.

In the first embodiment, since the second sensor module 3 is provided on the upstream side of the first sensor module 2, the liquid delivered to the first sensor module 2 is used for detecting the buffer ion residue. That is, in the detection of the buffer ion residue performed in the first sensor module 2 of the first embodiment, the influence of the buffer ion residue in the second sensor module 3 at the subsequent stage is not reflected.

However, when the sensor module systems of the first embodiment and the second embodiment are cleaned, a sufficient amount of cleaning liquid is supplied and the cleaning is performed over a sufficient time. Therefore, when the buffer ion component is not confirmed on the upstream side, the possibility that the buffer ion residue is present on the downstream side is low. Similarly, when the buffer ion component is not confirmed on the downstream side, the possibility that the buffer ion residue is present on the upstream side is low. Therefore, in the sensor module system 1 of the first embodiment and the sensor module system 200 of the second embodiment, although the objects for which the buffer ion residue is detected are strictly different, the configurations of the both systems have the same technical effect in that the presence of the buffer ion residue over the entire sensor module system can be identified in the probe molecule inspection of the sensitive film.

Third Embodiment

Figure 4:
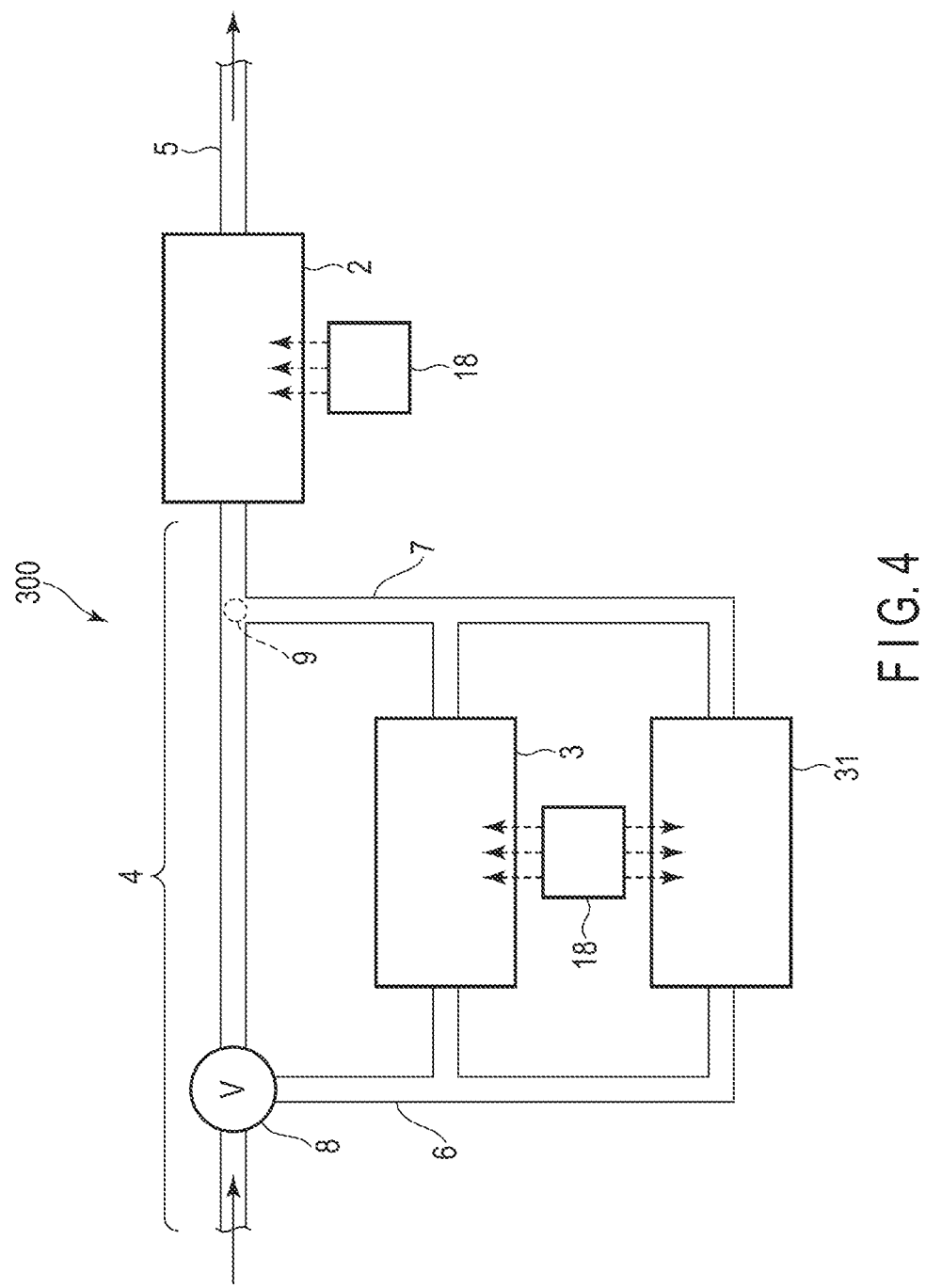
FIG. 4 is a schematic diagram illustrating a configuration of a sensor module system according to a third embodiment.

FIG. 4 is a schematic diagram illustrating a sensor module system according to a third embodiment. In FIG. 4, members similar to those in FIG. 1 described in the first embodiment are denoted by the same reference numerals, and description thereof is omitted.

A sensor module system 300 of the third embodiment is different from the sensor module system 1 of the first embodiment in that a third sensor module 31 is provided in parallel with a second sensor module 2. More specifically, in the sensor module system 300, as in the first embodiment, in addition to the fact that the third flow path 6 branches from the first flow path 4 in the valve 8 provided in the first flow path 4, the third flow path 6 further branches and is connected to the upstream end of the first sensor module 3 and the upstream end of the third sensor module 31. Similarly, the fourth flow path 7 is also branched, and is connected to the downstream end of the first sensor module 3 and the downstream end of the third sensor module 31.

When the target substance in the sample is analyzed using the sensor module system 300, the valve 8 is closed, and the supply of the liquid to the third flow path 6, the second sensor module system 3, and the fourth flow path 7 is stopped. Therefore, the liquid containing the sample delivered to the first flow path 4 is introduced only into the first sensor module 2. Thereafter, the liquid subjected to the analysis in the first sensor module 2 is discharged to the outside through the second flow path 5. Therefore, when the target substance in the sample is analyzed, the liquid containing the sample flows through the same flow path as the sensor module system 1 of the first embodiment.

However, the flow of the cleaning liquid at the time of cleaning the sensor module system 300 is different from that of the sensor module system 1 of the first embodiment. The cleaning liquid delivered from the liquid delivery port is divided into a flow passing through the first flow path 4 as it is and a flow to the third flow path 6 in the valve 8. The cleaning liquid delivered to the third flow path 6 is further divided into the second sensor module 3 and the third sensor module system 31. The liquid having passed through the second sensor module 3 and the third sensor module system 31 joins, passes through the fourth flow path 7, and further joins with the first flow path 4. Thereafter, the cleaning liquid passes through the first sensor module 2, passes through the second flow path 5, and is discharged.

The third sensor module 31 is a sensor module for performing reference measurement of the buffer ion residue inspection performed in the first sensor module 1. Here, the reference measurement in the present embodiment refers to measurement of a negative control in a buffer ion residue inspection. Specifically, in the reference measurement, the drain current flowing by applying the same voltage as that in the buffer ion residue inspection is measured in a state where monochromatic light is not irradiated. Therefore, the third sensor module 31 preferably has the same condition as that of the first sensor module 1 except that light irradiation is not performed. Therefore, the third sensor module 31 preferably has the same configuration as the first sensor module 1. However, since light irradiation is not performed in the reference measurement, the third sensor module 31 does not need to include the light source.

Since it can be confirmed by reference measurement that the change in the current value in the buffer ion residue inspection is caused by irradiation with monochromatic light, it is possible to increase the accuracy of the buffer ion residue inspection.

As a further embodiment, the third sensor module 31 may be connected in series with the first sensor module system 1, and may be disposed upstream or downstream of the first sensor module system 1. By connecting the two in series, the liquid having passed through one sensor module passes through the other sensor module, so that a more homogeneous liquid can be provided for measurement. However, in a case where the third sensor module 31 and the first sensor module system 1 are directly connected, there is a time difference between passing through one sensor module and reaching the other sensor module, and there is a possibility of being affected by stirring or the like during that time. In this regard, it is preferable to connect the third sensor module 31 and the first sensor module system 1 in parallel.

Figure 5:
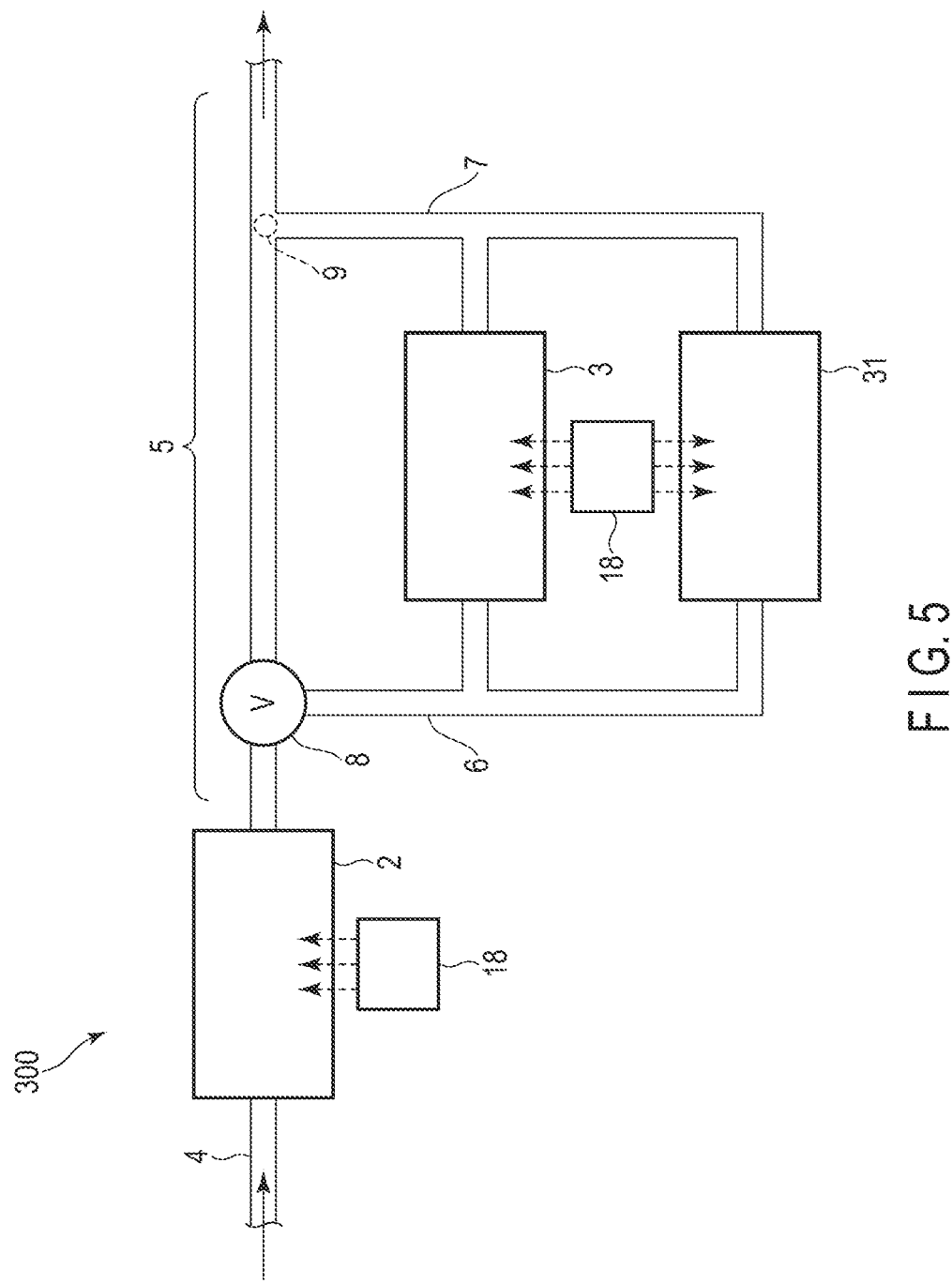
FIG. 5 is a schematic diagram illustrating another configuration of the sensor module system according to the third embodiment.

As a further embodiment, the third sensor module 31 of the sensor module system of the third embodiment may be configured to be provided in parallel with the second sensor module 2 of the sensor module system 200 of the second embodiment (see FIG. 5). According to such a configuration, as described in the second embodiment, it is possible to perform an inspection reflecting the influence of the buffer ion residue in the sensor module system 300 (that is, the first sensor module 2 is included) on the upstream side of the second sensor module 3.

Fourth Embodiment

Figure 6A:
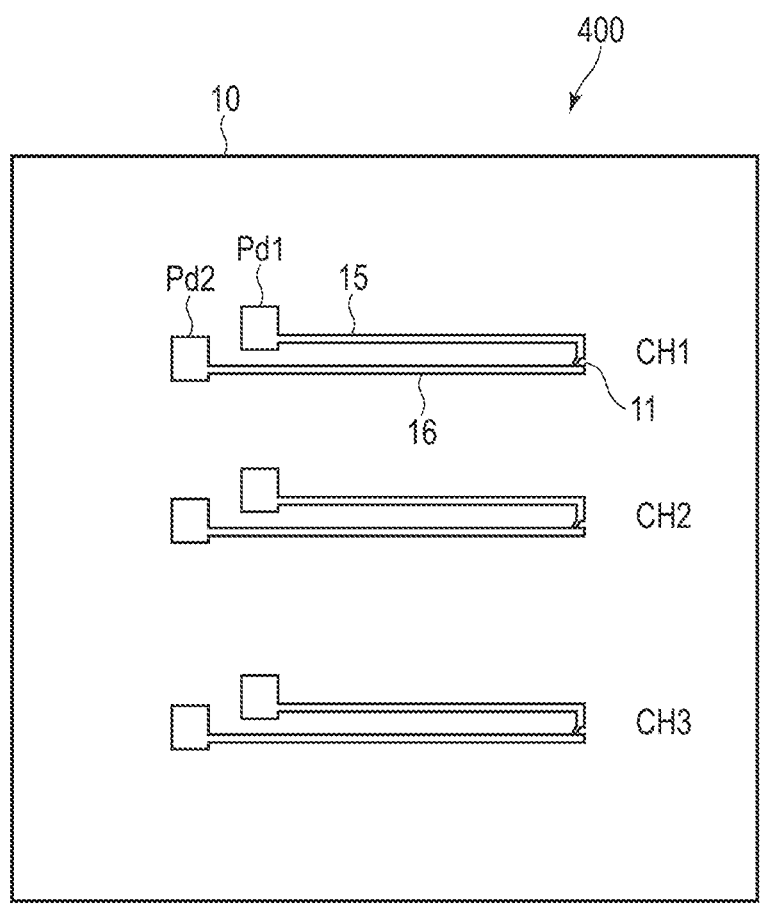
FIG. 6A is a schematic diagram illustrating a configuration of a sensor module system according to a fourth embodiment.
Figure 6B:
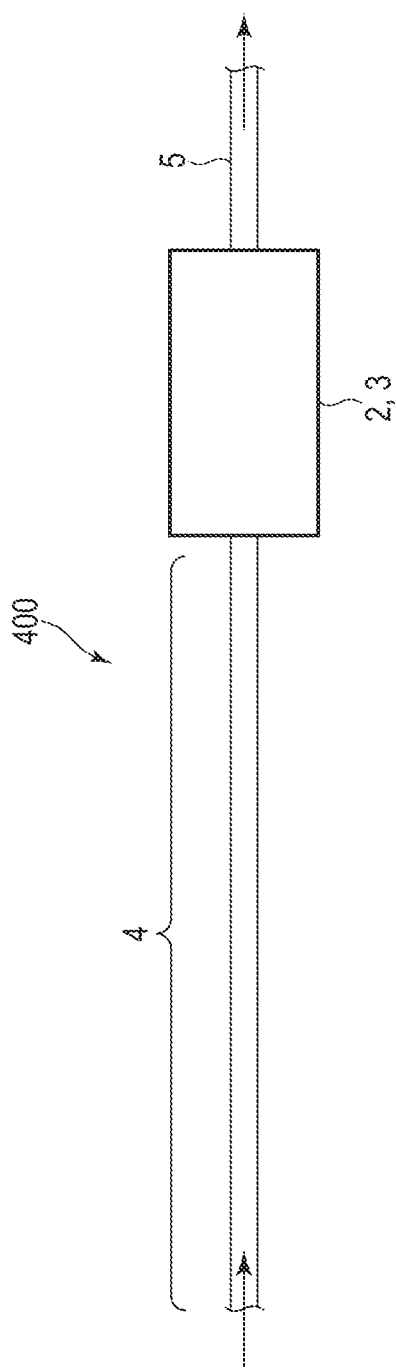
FIG. 6B is a schematic diagram illustrating another configuration of the sensor module system according to the fourth embodiment.

FIGS. 6A and 6B are schematic diagrams illustrating a sensor module system according to a fourth embodiment. In FIGS. 6A and 6B, members similar to those in FIG. 1 described in the first embodiment are denoted by the same reference numerals, and description thereof is omitted.

The fourth embodiment relates to a chemical sensor including a plurality of the sensor modules described in the first to third embodiments on the same substrate or on the same chip.

A sensor module system 400 includes a plurality of sensor elements on the same substrate 10, and each sensor element has the same configuration as the first sensor module 2 or the second sensor module 3 described in the first to third embodiments. That is, when each sensor element is an FET, each sensor element includes the source electrode 15 and the drain electrode 16 as described in the first embodiment. As illustrated in FIG. 6A, a first pad electrode Pd1 is connected to the source electrode 15, and a second pad electrode Pd2 is connected to the drain electrode 16.

Note that, although FIG. 6A illustrates a case where the sensor module system 400 includes a total of three sensor elements (specifically, two first sensor modules 2 (CH2 and CH3 in FIG. 6A) and one second sensor module 3 (CH1 in FIG. 6A)), one first sensor module 2 and one second sensor module 3 may be provided. In addition, the sensor module system 400 may include two or more first sensor modules 2 and two or more second sensor modules 3.

Further, in the sensor module system 400, some of the first flow path 4, the second flow path 5, the third flow path 6, the fourth flow path 7, and the junction 9 described in the first to third embodiments may be formed on the same substrate 10. In the sensor module system 400, the valves 8 described in the first to third embodiments may be formed on the same substrate 10. Furthermore, as illustrated in FIG. 6B, the sensor module system 400 may have a configuration that the second sensor module 3 and the first sensor module 2 are integrated with each other and connected to the first flow path 4 and the second flow path 5 without providing the third flow path 6 and the fourth flow path 7.

As described in the first embodiment, the difference in configuration between the first sensor module 2 and the second sensor module 3 is whether or not the first sensor module 2 and the second sensor module 3 have probe molecules. When the probe molecule is incorporated into the sensor module, the probe molecule can be formed by applying a material containing the probe molecule to the sensitive film surface of the sensor module, which does not include the probe molecule (that is, the configuration similar to that of the first sensor module). Therefore, it is possible to mount the first sensor module 2 and the second sensor module 3 on the same substrate by preparing a material containing probe molecules and a material not containing probe molecules and appropriately coating the respective materials on the sensor elements. Alternatively, a material containing probe molecules may be prepared, a sensor element to which the material is applied may be mounted as the first sensor module 2, and a sensor element to which the material is not applied may be mounted as the second sensor module 3.

Since the sensor module system of the fourth embodiment is provided in a state in which a plurality of the first sensor modules 2 and the second sensor modules 3 are provided on the same substrate, it is possible to save time and effort for assembling the system and to easily use the sensor module system. In addition, since it can be manufactured by the above-described simple operation, it is advantageous also in terms of manufacturing cost. Further, by setting the chip characteristics between the two sensor modules to the same condition, the reliability of the difference value of each signal obtained by the sensing in the first sensor module 2 and the second sensor module 3 is improved.

As a further embodiment, for example, a sensor module system including a plurality of first sensor modules 2 having different target substances on the same substrate may be manufactured by preparing a material containing different types of probe molecules and applying the material to each sensor element. For example, two types of materials PG1 and PG2 may be prepared, and the sensor elements CH2 and CH3 may be applied separately.

According to such a sensor module system, since a plurality of types of target substances can be detected using one sensor module system and the buffer ion residue inspection can be performed, it is possible to save time and effort to assemble a plurality of systems and to use the sensor module system more easily. In addition, since it can be manufactured by the above-described simple operation, it is advantageous also in terms of manufacturing cost.

Fifth Embodiment

Figure 7:
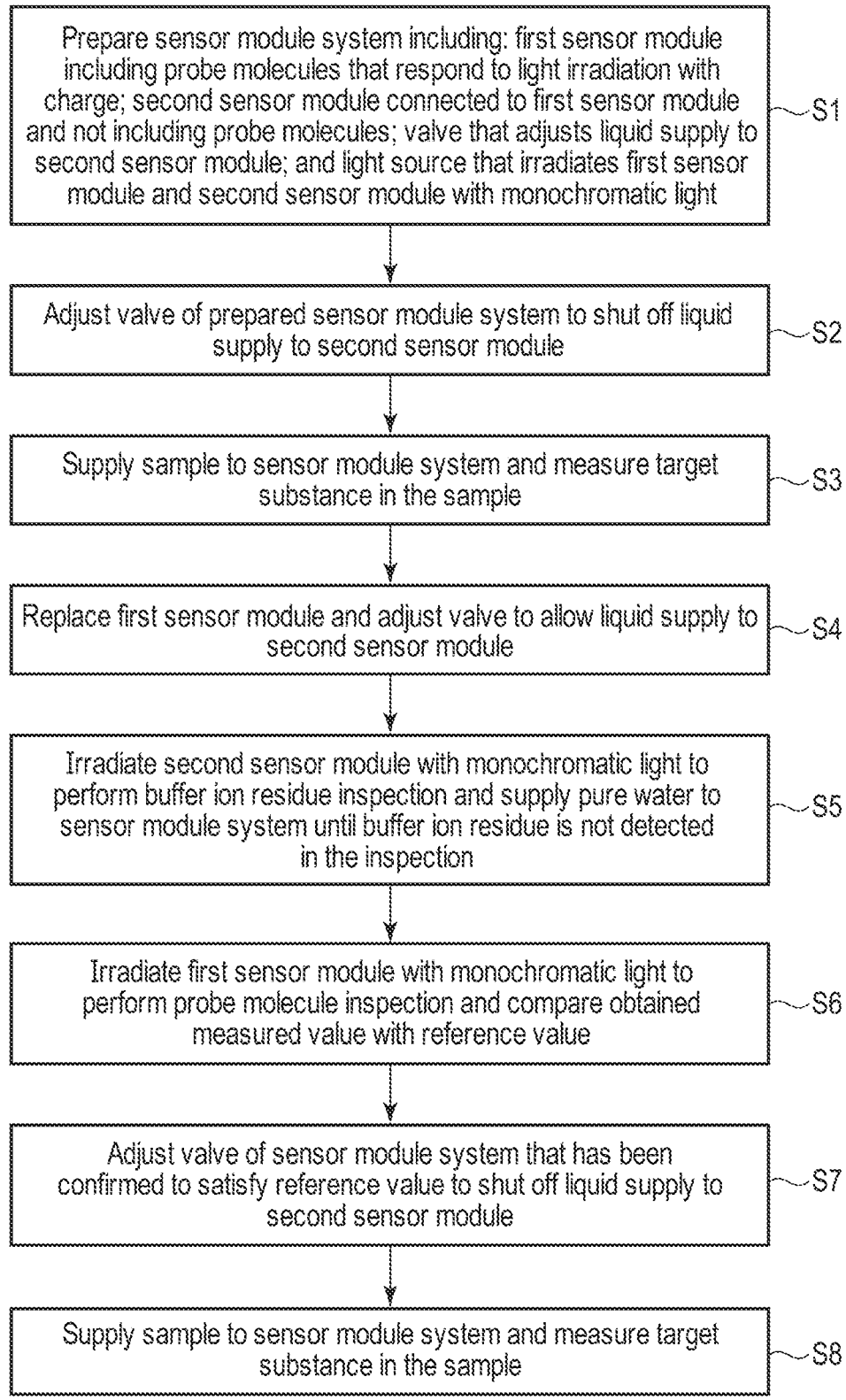
FIG. 7 is a flowchart illustrating a method for analyzing a target substance using the sensor module system according to the first to fourth embodiments.

A method according to a fifth embodiment is a method for measuring a target substance using the sensor module system according to the first to fourth embodiments repeatedly. The method according to the fifth embodiment will be described in detail with reference to FIG. 7.

The method according to the fifth embodiment includes: (S1) preparing a sensor module system including: a first sensor module including probe molecules that respond to light irradiation with charge; a second sensor module connected to the first sensor module and not including the probe molecules; a valve that adjusts liquid supply to the second sensor module; and a light source that irradiates the first sensor module and the second sensor module with monochromatic light; (S2) adjusting the valve of the sensor module system prepared in the (S1) to shut off liquid supply to the second sensor module; (S3) after the (S2), supplying a sample to the first sensor module and measuring a target substance in the sample; (S4) after the (S3), replacing the first sensor module and adjusting the valve to allow liquid supply to the second sensor module; (S5) irradiating the second sensor module of the sensor module system in which the first sensor module is replaced in the (S4) with monochromatic light to perform a buffer ion residue inspection, and supplying a cleaning liquid to the sensor module system until the buffer ion residue is not detected in the inspection; (S6) after the (S5), irradiating the first sensor module with monochromatic light to perform probe molecule inspection, and comparing an obtained measured value with a reference value; (S7) adjusting the valve of the sensor module system that has been confirmed to satisfy the reference value in the (S6) to shut off liquid supply to the second sensor module; and (S8) after the (S7), supplying a sample to the sensor module system, and measuring a target substance in the sample.

Note that the sensor module in (S1) may be in contact with a solution containing buffer ions. The sample in (S3) may be a liquid containing buffer ions. When the sensor module after the measurement is cleaned and reused, the sample remaining in the sensor module is removed by supplying the cleaning liquid in (S5) without replacing the sensor module in (S4).

The buffer ion residue inspection and the probe molecule inspection in the determination method according to the fifth embodiment can be performed by the procedure described in the first embodiment. Specifically, the buffer ion residue inspection can be performed by applying a voltage to the second sensor module, measuring a value indicating the electrical characteristic of the sensor element (for example, the magnitude of the current, and the like), and detecting whether the electrical characteristic has changed before and after the sensor element is irradiated with the monochromatic light from the light source. On the other hand, the probe molecule inspection can be performed by applying a voltage to the first sensor module, measuring a value indicating the electrical characteristic of the sensor element (for example, the magnitude of the current, and the like), and detecting whether the electrical characteristic has changed before and after the sensor element is irradiated with the monochromatic light from the light source.

In addition, the buffer ion residue inspection and the probe molecule inspection may be performed by qualitative measurement to determine the presence or absence of the buffer ion component or the probe molecule, or may be performed by quantitative measurement to determine the concentrations thereof. In the qualitative measurement, a threshold obtained in a preliminary experiment or the like may be set, and the presence or absence of a buffer ion component or a probe molecule may be determined when the threshold is exceeded. In the quantitative measurement, a correlation between a known amount of buffer ion component or probe molecule and the measured value may be investigated in advance by a preliminary experiment or the like, and the quantitative value may be determined from the measured value using the correlation.

As described in the first embodiment, the buffer ion component can be noise in probe molecule inspection. According to the determination method of the fifth embodiment, in (S3), the first sensor module is replaced, and in (S4), while the inside of the sensor module system is cleaned with the cleaning liquid, it is confirmed in (S5) that there is no influence of the buffer ion residue. Thereafter, since the probe molecule inspection is performed in (S6), the probe molecules can be detected with higher accuracy. As a result, even when the sensor module system is repeatedly used, the target substance can be detected with high accuracy.

In addition, the reference value in (S5) is a value serving as an index indicating that the sensor module system can detect the target substance with high accuracy. The reference value is, for example, a value of a change in an electrical characteristic obtained in a preliminary experiment using a sensor module system including a sensor element capable of detecting a target substance with desired accuracy and having a known density of probe molecules. In such a preliminary experiment, a correlation between the value of the change in the electrical characteristic and the density may be obtained, and a value determined from the correlation may be used as the reference value. Therefore, in (S5), by providing such a reference value and comparing the reference value with the measured value obtained by probe molecule inspection, it can be confirmed that the sensor module system prepared in (S4) can accurately detect the target substance when the measured value satisfies the reference value.

EXAMPLE

Hereinafter, a sensor module system according to an embodiment will be described using experimental data.

Example 1: Buffer Ion Residue Inspection Using Second Sensor Module

Preparation of Three Types of Second Sensor Modules

Figure 2:
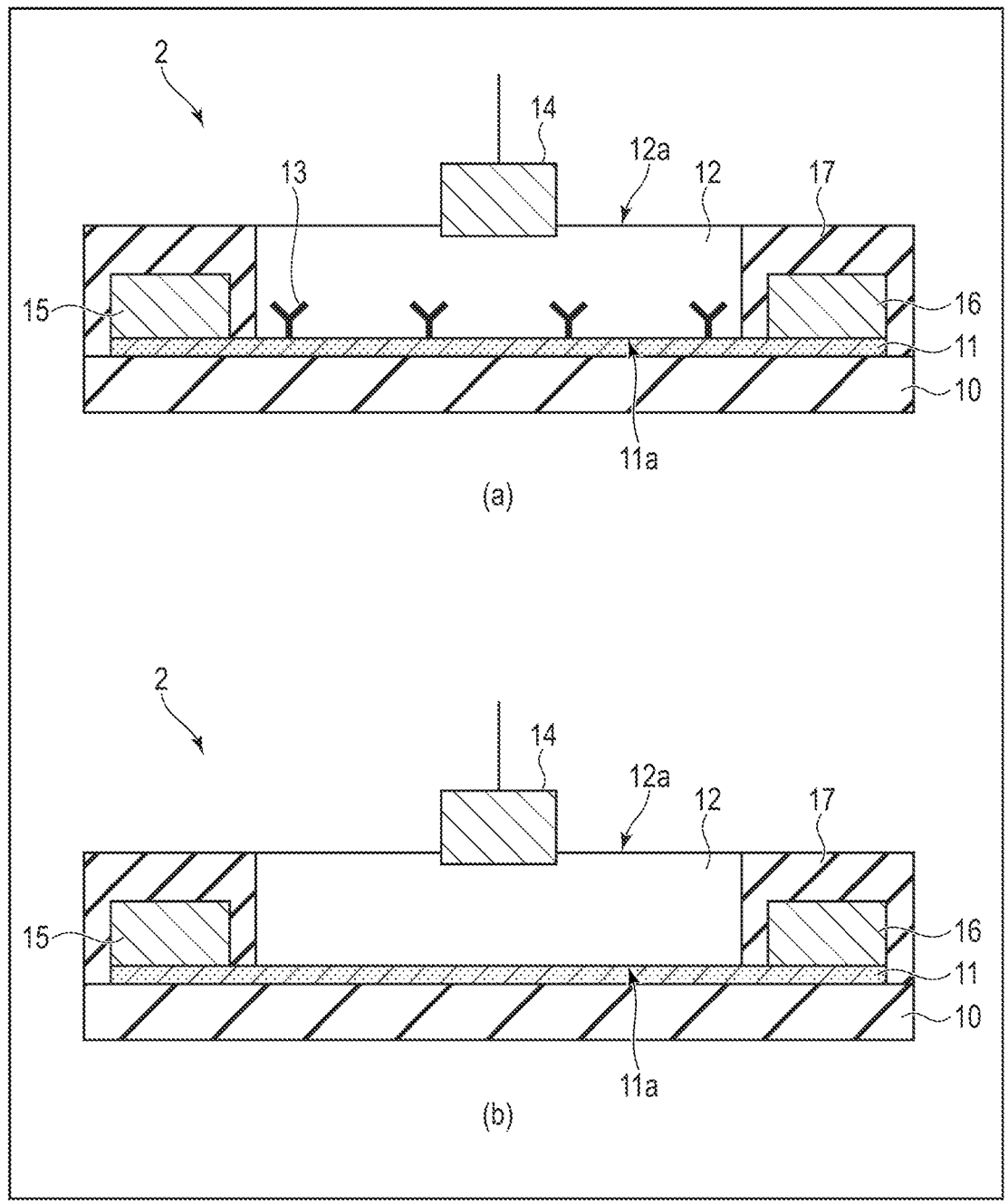
FIG. 2 is a diagram for explaining a configuration of the sensor module system according to the first embodiment, wherein part (a) of FIG. 2 is a schematic cross-sectional view of a first sensor module, and part (b) of FIG. 2 is a schematic cross-sectional view of a second sensor module.

An FET sensor element having the same structure as that of the second sensor module of the first embodiment, that is, three sensor modules illustrated in part (b) of FIG. 2 were prepared. The sensor element included in the sensor module is a single-layer graphene film. A voltage application circuit is connected to each sensor module, and a gate voltage can be applied between the gate electrode and the source electrode, and a drain voltage can be applied between the drain electrode and the source electrode. Although not illustrated, each sensor module includes an ammeter for measuring a drain current and a light source capable of emitting monochromatic light having a wavelength of about 350 nm to 800 nm. The slit length of the light source is 1.2 mm.

In each of the prepared three second sensor modules, a liquid film including solutions having different solutes was formed so as to cover the single-layer graphene film. Specifically, as three second sensor modules, a sensor module including a liquid film made of pure water, a sensor module including a liquid film made of a sodium chloride aqueous solution, and a sensor module including a liquid film made of a 4-(2-hydroxyethyl)-1 piperazine ethanesulfonic acid (HEPES) solution as a buffer solution were prepared. Ultrapure water was used as pure water.

Measurement Using Prepared Second Sensor Module

A constant voltage (=650 mV) was applied to the three types of second sensor modules prepared as described above, and the temporal change of the drain current was measured. In addition, in the measurement of the temporal change of the drain current, monochromatic light having different wavelengths was irradiated in the order of 800 nm, 700 nm, 600 nm, and 500 nm for 30 seconds at a time interval of about 1 minute, and whether or not the value of the drain current changed was measured.

Results

The results of the buffer ion residue inspection are shown in part (a) to (c) of FIG. 8. Part (a) of FIG. 8 shows a measurement result of a second sensor module including a liquid film made of a HEPES solution, part (b) of FIG. 8 shows a measurement result of a second sensor module including a liquid film made of pure water, and part (c) of FIG. 8 shows a measurement result of a second sensor module including a liquid film made of a sodium chloride aqueous solution.

In part (a) to (c) of FIG. 8, it can be seen that there is no correlation with the irradiation timing of the monochromatic light, and there is a common tendency that the drain current gradually decreases with the lapse of the measurement time. This is a drift specific to electrochemical phenomenon measurement.

However, referring to part (a) of FIG. 8, it was observed that when irradiation with monochromatic light of 800 nm, 700 nm, 600 nm, or 500 nm is started, the value of the drain current decreases, a decreased state is maintained while each monochromatic light is irradiated, and when the irradiation is ended, the decreased value increases. On the other hand, referring to part (a) and (b) of FIG. 8, it can be seen that the value of the drain current does not change even when the second sensor module including the liquid film made of pure water and the second sensor module including the liquid film made of the sodium chloride aqueous solution are irradiated with the monochromatic light. Therefore, it was found that when the buffer ion component is contained in the liquid film, the value of the drain current changes by irradiation with monochromatic light.

Negative Control Experiment for Buffer Ion Residue Inspection

In the buffer ion residue inspection using the second sensor module of Example 1, as a negative control, a constant voltage (=650 mV) was applied to measure the temporal change of the drain current, but a system not irradiated with monochromatic light was also prepared and measurement was performed. The negative control is performed in a second sensor module including a liquid film made of pure water and a second sensor module including a liquid film made of a HEPES solution.

Results

The experimental results of the negative control of Example 1 are shown in part (a) and (b) of FIG. 9. Part (a) of FIG. 9 shows a result of a negative control experiment of the second sensor module including a liquid film made of a HEPES solution, and part (b) of FIG. 9 shows a result of a negative control experiment of the second sensor module including a liquid film made of pure water.

In both part (a) and (b) of FIG. 9, a tendency that the drain current gradually decreases with the lapse of the measurement time was observed, but as compared with part (a) and (b) of FIG. 8, a significant change in the current value as observed at the timing of light irradiation was not observed. Therefore, it was shown that the change in the current value observed in the buffer ion residue inspection of Example 1 was caused by the irradiation of the monochromatic light.

Example 2: Probe Molecule Inspection Using First Sensor Module

Preparation of Two Types of First Sensor Modules

An FET sensor element having the same structure as that of the first sensor module of the first embodiment, that is, two sensor modules illustrated in part (a) of FIG. 2 were prepared. The sensor element included in the sensor module is a single-layer graphene film, and a nucleic acid probe of several tens of bases is solid-phased on the surface thereof as a probe molecule. A voltage application circuit is connected to each sensor module, and a gate voltage can be applied between the gate electrode and the source electrode, and a drain voltage can be applied between the drain electrode and the source electrode. Although not illustrated, each sensor module includes an ammeter for measuring a drain current and a light source capable of emitting monochromatic light having a wavelength of about 350 nm to 800 nm. The slit length of the light source is 1.2 mm.

Negative Control Experiments for Probe Molecule Inspection

Pure water was supplied to the first sensor module prepared as described above, a constant voltage (=650 mV) was applied, and the temporal change of the drain current was measured. In addition, in the measurement of the temporal change of the drain current, monochromatic light having different wavelengths was irradiated in the order of 800 nm, 700 nm, 600 nm, and 500 nm for 30 seconds at a time interval of about 1 minute, and whether or not the value of the drain current changed was measured.

Results

Part (a) of FIG. 10 shows the results of a negative control experiment of probe molecule inspection. In the negative control experiment, it can be seen that no significant change occurred in the drain current before and after irradiation with monochromatic light.

Binding of the Fluorescent Dye to the Probe Molecules of the First Sensor Module An aqueous solution containing 100 µM of rhodamine 6G (prepared with pure water) was added to the first sensor module used in the negative control experiment described above. Since rhodamine 6G is a fluorescent dye, rhodamine 6G can be bound to the probe molecule of the first sensor module by adding the aqueous solution. Furthermore, by supplying a sufficient amount of an 8 mM sodium chloride aqueous solution after adding the rhodamine 6G-containing aqueous solution, the first sensor module was cleaned so as to discharge rhodamine 6G not bound to the probe molecules. That is, a first sensor module including a probe molecule to which rhodamine 6G was bound was prepared.

Probe Molecule Inspection Using First Sensor Module

A constant voltage (=650 mV) was applied to the first sensor module prepared as described above to which the fluorescent dye was bound, and the temporal change of the drain current was measured. In addition, in the measurement of the temporal change of the drain current, monochromatic light having different wavelengths was irradiated in the order of 800 nm, 700 nm, 600 nm, and 500 nm for 30 seconds at a time interval of about 1 minute, and whether or not the value of the drain current changed was measured.

Results

The results of the probe molecule inspection are shown in part (b) of FIG. 10. Referring to part (b) of FIG. 10, it can be seen that a significant change in drain current as not observed in the negative control experiment occurred before and after irradiation with monochromatic light. Therefore, it was shown that by binding the fluorescent dye to the probe molecule, the probe molecule can be detected by irradiation with monochromatic light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor module system comprising:
    a first sensor module including probe molecules that respond to light irradiation with charge;
    a second sensor module not including the probe molecule;
    a first flow path connected to one end of the first sensor module;
    a second flow path connected to the other end side of the first sensor module;
    a third flow path branching from the first flow path and connected to one end side of the second sensor module;
    a fourth flow path connected to the other end side of the second sensor module and joined with the first flow path; and
    a valve that is disposed at a junction of the first flow path and the third flow path and is capable of opening and closing the third flow path.

2. The sensor module system according to claim 1, wherein
    each of the third flow path and the fourth flow path further includes a branch flow path, and
    the sensor module system further comprises a third sensor module connected to the branch flow path of the third flow path and the branch flow path of the fourth flow path.

3. A sensor module system comprising:
    a first sensor module including probe molecules that respond to light irradiation with charge;
    a second sensor module not including the probe molecule;
    a first flow path connected to one end of the first sensor module;
    a second flow path connected to the other end side of the first sensor module;
    a third flow path branching from the second flow path and connected to one end side of the second sensor module;

a fourth flow path connected to the other end side of the second sensor module and joined with the second flow path; and a valve that is disposed at a junction of the second flow path and the third flow path and is capable of opening and closing the third flow path.

4. The sensor module system according to claim 3, wherein each of the third flow path and the fourth flow path further includes a branch flow path, and the sensor module system further comprises a third sensor module connected to the branch flow path of the third flow path and the branch flow path of the fourth flow path.

5. The sensor module system according to claim 1, wherein the first sensor module includes a first sensitive film and a first source electrode and a first drain electrode connected to both ends of the first sensitive film, the second sensor module includes a second sensitive film and a second source electrode and a second drain electrode connected to both ends of the second sensitive film, and the sensor module system further comprises a light source that irradiates the first sensitive film and the second sensitive film with light.

6. The sensor module system according to claim 5, further comprising:

a second valve connected to the other end of the first flow path;

a first branch flow path and a second branch flow path connected to the other end of the first flow path via the second valve;

a first container that is connected to the other end of the first branch flow path and stores a sample; and a second container that is connected to the other end of the second branch flow path and stores a cleaning liquid, wherein the cleaning liquid is a liquid containing no buffer ion component.

7. The sensor module system according to claim 6, further comprising a control circuit and a valve controller that opens and closes the second valve, wherein the control circuit controls the valve controller.

8. The sensor module system according to claim 7, wherein the control circuit controls the valve controller to open the second branch flow path to electrically connect the first flow path and the second container, and determines whether or not a signal value output from the second sensor module has varied between a time of light irradiation and a time of light non-irradiation, and controls the valve controller to close the second branch flow path not to connect the first flow path and the second container when it is determined that the signal value has not varied.

9. The sensor module system according to claim 7, wherein the control circuit controls the valve controller to open the second branch flow path to connect the first flow path and the second container, determines whether or not a signal value output from the second sensor module has varied between a time of light irradiation and a time of light non-irradiation, determines whether or not a signal value output from the first sensor module has varied between a time of light irradiation and a time of light non-irradiation, and controls the valve controller to open the first branch flow path to connect the first flow path and the first container when it is determined that the signal value of the second sensor module has not varied and it is determined that the signal value of the first sensor module has varied.

10. The sensor module system according to claim 7, wherein the control circuit determines that the probe molecule is in a normal state when a signal value output from the second sensor module has not varied between a time of light irradiation and a time of light non-irradiation, and a signal value output from the first sensor module has varied between a time of light irradiation and a time of light non-irradiation.

11. The sensor module system according to claim 7, wherein the sample is a liquid containing a buffer ion component.

12. The sensor module system according to claim 7, wherein the light source emits monochromatic light.

13. The sensor module system according to claim 1, wherein the first sensor module and the second sensor module are provided on a same substrate.

14. A sensor module system for measuring a target substance in a sample, the sensor module system comprising:

a substrate on which a first sensor module including a sensitive film that has a probe molecule that captures a target substance and responds to light irradiation with charge and a second sensor module including a sensitive film that does not have the probe molecule are mounted;

a light source that irradiates the sensitive film with monochromatic light;

a first flow path connected to one end of the first sensor module;

a second flow path connected to the other end of the first sensor module; and a container that is connected to the other end of the first flow path and stores a cleaning liquid.

* * * * *